US009026530B2

(12) United States Patent
Gouyet et al.

(10) Patent No.: US 9,026,530 B2
(45) Date of Patent: May 5, 2015

(54) SYNTHESIZING SEARCH ENGINE OPTIMIZATION DATA FOR DIRECTORIES, DOMAINS, AND SUBDOMAINS

(75) Inventors: Albert Mark Gouyet, Palo Alto, CA (US); Jimmy Yu, Foster City, CA (US); Lemuel S. Park, Cerritos, CA (US)

(73) Assignee: Brightedge Technologies, Inc., San Mateo, CA (US)

( * ) Notice: Subject to any disclaimer, the term of this patent is extended or adjusted under 35 U.S.C. 154(b) by 392 days.

(21) Appl. No.: 13/209,651

(22) Filed: Aug. 15, 2011

(65) Prior Publication Data
US 2013/0046747 A1 Feb. 21, 2013

(51) Int. Cl.
*G06F 17/30* (2006.01)
*G06F 7/00* (2006.01)
*G06Q 30/02* (2012.01)

(52) U.S. Cl.
CPC ...... *G06F 17/30864* (2013.01); *G06Q 30/0242* (2013.01); *G06F 17/30899* (2013.01)

(58) Field of Classification Search
CPC ..................... G06Q 30/0242; G06F 17/30899
USPC ......................................................... 707/736
See application file for complete search history.

(56) References Cited

U.S. PATENT DOCUMENTS

| 7,979,386 | B1 | 7/2011 | Sholtis et al. | |
| 8,001,107 | B2 * | 8/2011 | Venkataramanujam | 707/709 |
| 8,396,857 | B2 * | 3/2013 | Kamel et al. | 707/711 |
| 8,494,897 | B1 * | 7/2013 | Dawson | 705/7.33 |
| 2005/0097202 | A1 * | 5/2005 | Hegerty et al. | 709/223 |
| 2008/0071766 | A1 * | 3/2008 | Grieselhuber et al. | 707/5 |
| 2009/0132524 | A1 * | 5/2009 | Stouffer et al. | 707/5 |
| 2009/0282000 | A1 | 11/2009 | Bennett | |
| 2009/0307056 | A1 * | 12/2009 | Park et al. | 705/10 |
| 2010/0114864 | A1 * | 5/2010 | Agam et al. | 707/709 |
| 2010/0119053 | A1 | 5/2010 | Goeldi | |
| 2010/0131563 | A1 * | 5/2010 | Yin | 707/794 |
| 2011/0055217 | A1 * | 3/2011 | Kamel et al. | 707/741 |

OTHER PUBLICATIONS

International Search Report dated Jan. 29, 2013 in Application No. PCT/US2012/050985.
Written Opinion of the International Searching Authority dated Jan. 29, 2013 in Application No. PCT/US2012/050985.

* cited by examiner

*Primary Examiner* — Charles Lu
(74) *Attorney, Agent, or Firm* — Maschoff Brennan

(57) ABSTRACT

SEO for an entire website can change the presence of the website on the internet, and change which webpages of the website rank higher for different internet searches. The SEO optimized website can provide a particular webpage in response to a particular search engine query rather than a generic landing page. SEO can determine a unified website configuration having individual webpages with higher search engine rankings for specific search engine parameters. This can allow for enhanced search engine optimization that directs search engine results to rank selected pages within a website higher than others to provide a more directed search result within the website.

22 Claims, 13 Drawing Sheets

| Latest Reporting Period | Avg. Position | Position 1 to 10 | Position 11 to 10 | Position 21-30 | Position 1 to 100 |
|---|---|---|---|---|---|
| Dec 26, 2010 to Jan 1, 2011 | 53 | 8 +1 | 6 -2 | 6 +1 | 33 +1 -3 |

KEYWORD DETAILS

Week: Dec 26, 2010 to Jan 1, 2011    Change Date Range            Show: All Keywords ▽

Keyword ▽    [Search]  Advanced Filter

| Keyword / Top Ranked Page ◀ | Position | Position Change | Ranked Page | | Search Frequency |
|---|---|---|---|---|---|
| Sports Jerseys | 10 | +2! | www._.com | | 2500 |
| Baby Golf Shoes | 9 | +30 | www._.com/url1<br>www._.com/url2 | | 500 |
| Sports Jerseys | 11 | -3! | uk._.com<br>uk._.com/url1 | | 2500 |
| Baby Golf Shoes | 15 | +3 | uk._.com/url4 | | 500 |
| Etc. | | | | | |

*Fig. 10*

Add Chart: Configure Chart Settings

Select Account     -CompanyA-.com ▾

Company A UK
Select Keyword Group    -.com
                 uk.-.com
Select Search Engine    store.-.com/uk
                 -Comp1-.com
Select Competitor(s)     -Comp2-.com -comp3a-.com
                 -comp3b-.com
                 -comp3c-.com
                 -comp3d-.com
                 -comp4-.com
                 -comp5-.com
                 -comp6-.com
                 -comp7-.com
                 -comp8-.com
                 -comp9-.com
                 -comp9a-.com
                 -comp10-.com
                 -comp11-.com
                 -comp12-.com
                 -comp12a-.com
                 -comp13-.com
                 -comp14-.com
                 -comp15-.com Enter Chart Name     Untitled Chart Select Chart Width     ● half width    ○ full width Select Pages     Report All Pages ▾
              Report Top Page Only

*Fig. 12*

SYNTHESIZING SEARCH ENGINE OPTIMIZATION DATA FOR DIRECTORIES, DOMAINS, AND SUBDOMAINS

BACKGROUND

Search engine optimization (SEO) generally describes the use of computing systems for running computing processes that collect, store and analyze search engine data in order to provide recommendations to improve visibility of a website or a webpage in search engines. Search engine results can be obtained by various search strategies, such as natural, unpaid, organic, or algorithmic search results as well as for paid search algorithms of search engine marketing (SEM) target paid listings. Generally, the higher a website is located on a website listing and the more frequently a website appears in the search results list, the more visitors it will receive from the search engine's users. SEO may target different kinds of search, including image search, local search, video search, news search and industry-specific vertical search engines. The SEO can improve the availability of a website to internet users.

SEO is implemented by Internet Technology (IT) professionals to improve the volume and quality of traffic to a given webpage or other Internet site. Typical techniques include keywords in title tags, keywords in meta tags, keywords in body text, anchor text in inbound links, age of site, site structure, link popularity in a site's internal link structure, amount of indexable text/page content, number of links to a site, popularity/relevance of links to site and topical relevance of inbound link tags, any of which can include SEO data. Additional techniques are sometimes employed based on the search engine for which the webmaster is attempting to optimize. Since search engine algorithms and metrics are proprietary, search engine optimization techniques are widely used to improve visibility of a webpage or other Internet site on search engine result pages.

Often, SEO is employed to optimize a company's website against a competitor's website. However, there still remains a need to optimize a company's search engine results so that the individual webpages within a site can be provided in website lists in accordance with preference by the company as well as for increasing business and sales.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Generally, the present invention relates to computing systems, computing devices, and computing methods for enhanced search engine optimization (SEO) of a website. The SEO for the entire website can change the presence of a website on the internet and change which webpages of the website rank higher for different internet searches. The SEO optimized website can provide a particular webpage in response to a particular search engine query rather than a generic landing page. The present invention can be used in order to determine a unified website configuration having individual webpages with higher search engine rankings for specific search engine parameters. This can allow for enhanced search engine optimization that directs search engine results to rank selected pages within a website higher than others to provide a more directed search result within the website. For example, instead of always being directed to a generic landing page, a set of search engine parameters can now direct an end user to a page more appropriate with respect to the search.

These and other aspects of example embodiments of the invention will become more fully apparent from the following description and appended claims.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 illustrates a representation of a screenshot of a graphical interface of ranked page results of SEO analysis as described herein;

FIG. 12 illustrates a representation of a screenshot of a graphical interface for configuring chart settings for a selected account, all arranged in accordance with at least one of the embodiments described herein, and which arrangement may be modified in accordance with the disclosure provided herein by one of ordinary skill in the art.

DETAILED DESCRIPTION

Figure 1A:
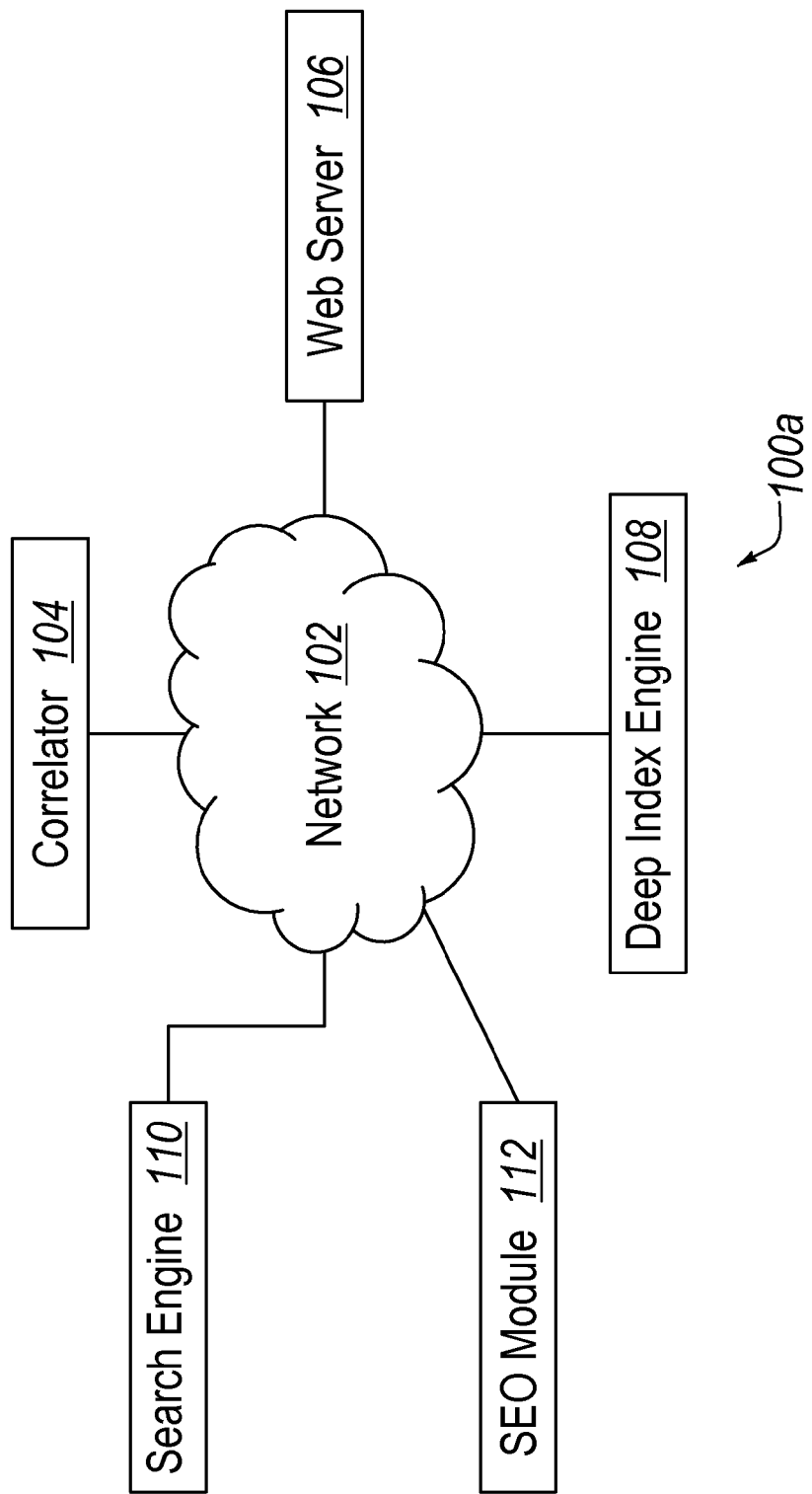
FIG. 1A illustrates an embodiment of a SEO system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention includes the computing systems and computing processes used in methods of improving SEO performance by synthesizing the SEO data for website directories, domains, and subdomains. The SEO performance can be optimized with respect to the different webpages and webpage hierarchy within a website so that particular users can arrive at specific webpages based on keywords or keyword combinations as well as other SEO parameters such as geographic location based search results. This new SEO technology allows for larger entities, such as global companies as one example, with larger internet footprints to enhance web traffic patterns of their websites so better align with the user. The larger the internet footprint, the higher the possible number of webpages that a search engine may return for a given website. The higher the possible number of webpages returned, the less likely that a user will land on the optimum page for their intent and purpose. The present invention now allows websites to be configured so that select search engine parameters can preferentially direct a user to a particular webpage related to a search rather than a generic landing page.

The invention can include a computing system that has a determination module configured to determine the status of particular webpages within a website and a recommendation module that can make a recommendation to change the parameters of the particular webpages so that and end user can land an appropriate webpage within a website instead of the main domain webpage, such as a ".com" or ".net" webpage or the like. The determination module can be configured as software to include a determination engine that can process determination algorithms in accordance with the teachings provided herein. The recommendation module can also be configured as software to include a recommendation engine that can process recommendation algorithms in accordance with the teachings herein. Some functionality of the determination module may be performed by an analytic module that is configured to perform analytic method on the website.

For example, a company can have a North American presence and have web information on websites prepared for American users and different websites for Canadian users. The present invention is configured to improve global SEO of a website by crawling the website to collect webpage specific SEO data, and provide a recommendation on one or more strategies to improve web traffic patterns on their website. In this example, the company can have main domain webpage with "_.com," a U.S. main webpage with "_.us," a Canadian main webpage "_.ca," a U.S. subdomain with "us._.com," a Canadian subdomain with "ca._.com," a U.S. directory "_.com/us," or a Canadian directory "_.com/ca." These main pages may have a large number of subpages. In prior search engines, the user may be directed to the wrong landing webpage as a result of the different directories, domains, and subdomains. Previously, SEO has not been implemented in order to optimize search results for individual pages within a website. Now, the present invention can synthesize the SEO data for the individual webpages, such as with the addresses recited above, in order to have an improved landing webpage within a website for a given set of search parameters.

The determination module can be configured to crawl a website to identify SEO data, such as but not limited to keywords and search engine results, and can process the SEO data to identify how the different webpages of a website rank with respect to each other and with respect to keywords or other SEO data. The website crawl can also be used by the determination module in order to identify and group webpages that may have overlapping keywords or SEO data, and related webpages can be grouped or categorized or indexed for SEO processing. The determination model can use the SEO data to determine how to present a unified website through the individual webpages with regard to internet website searches. The determination module can be configured to determine how to handle a complicated data model, such as a large website that has a multinational or global presence. The determination module can be configured to analyze the webpages of the website, such as directories, domains, and subdomains, so that the particular pages for different countries can be optimized and directed for SEO. This can include the determination module analyzing the different webpage keywords, as well as overlap of keywords to different pages. This analysis may include an analysis of the search parameters that provide a US-based landing webpage compared to a Canadian-based landing webpage. The determination model can thereby overcome intra-website confusion due to overlapping search parameters. The determination module may also be configured to obtain data about different search engine functionality so that the website can be optimized in order to direct a user to a better landing webpage rather than a generic domain or subdomain. Different recommendations can be made for different search engines during the SEO procedure for a website.

The recommendation module can be configured to receive data from the determination module and process the data in order to provide a recommendation for improved SEO performance. The determination module and recommendation module can be included in a single module that has dual functionality for the separate functions as described herein. The recommendation module can be configured to process the data in order to identify an improved SEO strategy. This improved SEO strategy can then be employed by a website so that search results are more directed to particular desired webpages within a website.

Some embodiments described herein include a platform that analyzes a website and provides recommendations in three dimensions: (1) every country-specific website has its own keywords (or SEO parameters) for drawing users to the website for that country; (2) there is likely to be significant overlap in keywords (or SEO parameters) over different countries for the same website; and (3) different search engines treat different search keywords (or SEO parameters) differently such that the same keywords will return different webpage rakings by different search engines. The platform can then be used to improve a website.

For example, customers may not know how to organize their websites with regard to SEO parameters that makes sense. The determination and recommendation platform can identify, obtain, and analyze SEO data for a website, and then allocate specific SEO data (e.g., keywords or combinations of keywords) to specific webpages. The determination and recommendation platform can also assign different goals for each category of webpages of a website (e.g., different countries are different categories) so that the individual webpages are optimized for landing. The determination and recommendation platform can also be used to analyze how SEO operates for different search engines, and provide a recommendation as to how to optimize the website for particular landing webpages for different search engines.

The determination and recommendation platform can be used to improve a website SEO so that search engines handle different search queries in a manner that improves the landing webpage to be directed to the search parameters provided by a user to a search engine rather than a generic landing webpage or landing domain name webpage. The recommendation data can be used to create global website that can account for the different search parameters of to support global users.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1A illustrates shows a SEO system 100a, which can include a network 102. In some embodiments, the network 102 can be used to connect the various parts of the system 100a to one another, such as between a web server 106, a deep index engine 108, a correlator 104, a search engine 110, and a SEO module 112. It will be appreciated that while these components are shown as separate, the components may be combined as desired. Further, while one of each component is illustrated, the system 100a may optionally include any number of each of the illustrated components.

The network 102 may include the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 includes one or more cellular RF networks and/or one or more wired and/or wireless networks such as, but not limited to, 802.xx networks, Bluetooth access points, wireless access points, IP-based networks, or the like. The network 102 can also include servers that enable one type of network to interface with another type of network.

The web server 106 can include any system capable of storing and transmitting a webpage to a user. The web server 106 can provide access to the webpages of a website to be analyzed for improving SEO. For example, the web server 106 can include a computer program that is responsible for accepting requests from clients (user agents such as web browsers), and serving them HTTP responses along with optional data contents, which can include HTML documents and linked objects for display to the user. Additionally or alternately, the web server 106 can include the capability of logging some detailed information, about client requests and server response, to log files.

The website can include any number of webpages. The aggregation of references to the various webpages can be referred to as traffic. It should be noted that webpage as used herein refers to any online posting, including domains, subdomains, web posts, Uniform Resource Identifiers ("URIs"), Uniform Resource Locators ("URLs"), images, videos, or other piece of content and non-permanent postings such as e-mail and chat unless otherwise specified.

External references to a webpage can include any reference to the webpage which directs a visitor to the webpage. For example, an external reference can include text documents, such as blogs, news items, customer reviews, emails or any other text document which discusses the webpage. Alternately or additionally, an external reference can include a webpage which includes a link to the webpage. For example, an external reference can include other webpages, search engine results pages, advertisements or the like.

In some embodiments, the deep index engine 108 is configured to use identified search terms related to one or more webpages of the website in order to perform a search of the network to identify ranking of webpages in the website. The deep index engine 108 may be further configured to score the results of the search network with respect to the webpages of the website. This score may include a position at which a particular webpage is displayed within the search results with regard to a keyword or keyword combination. The relative position of the webpages within the search result can affect how the keyword or keyword combination affect actions of a search engine relative to a webpage. Accordingly, by determining the relative position of the webpages of a website within search results, the deep index engine 108 may be able to determine a current performance metric for each of the webpages and/or search terms as they relate to the website.

Alternately or additionally, the deep index engine 108 may be configured to score the search results for each of the search terms with respect to other entities, including entities found in the competitive listing for the search results. Accordingly, the deep index engine 108 may be configured to gather external data related to performance of the webpages of the website.

Alternately or additionally, the deep index engine 108 may be configured to crawl the search results related to each of the search parameters to retrieve external data. In particular, the deep index engine 108 may be configured to crawl the search results for each of the search terms and analyze data associated with the crawl, including on-page information and back link data (e.g., back link URL, anchor text, etc.) for each URL in the search result. The deep index engine 108 may then analyze the data to identify additional search terms that may be relevant for each webpage, but which may not have been searched or on which the webpages do not rank. In some embodiments, this analysis may include conducting a keyword frequency search. Accordingly, the deep index engine 108 may be configured to surface additional search terms for relation to the webpages of the website. In some embodiments, these additional search terms and opportunities are identified and targeted in any channel (e.g., SEO, paid search, social networks, etc.). Cross-channel opportunities are also a part of the opportunity identification (e.g., if a customer is not ranking on a keyword on organic search that a competitor ranks on, the customer can immediately target this keyword in paid search).

A deep index engine 108 according to some embodiments is described in more detail in copending U.S. patent application Ser. No. 12/436,704 entitled COLLECTING AND SCORING ONLINE REFERENCES, filed May 6, 2009, which application is hereby incorporated by reference in its entirety. The functionalities described herein can be applied to optimizing webpages for a website.

Additional current performance metrics may include internal data determined by the correlator 130. The correlator 130 may determine how visitors are directed to the entity and how those visitors behave once there. For example, the correlator 130 can correlate conversion of visits to the search terms that drove the visits.

A correlator 104 according to some embodiments is described in more detail in co-pending U.S. patent application Ser. No. 12/574,069, filed Oct. 6, 2009 entitled CORRELATING WEB PAGE VISITS AND CONVERSIONS WITH EXTERNAL REFERENCES, which application is hereby incorporated by reference in its entirety. The functionalities described herein can be applied to optimizing webpages for a website.

The correlator 104 or other component may be configured to collect web analytics data from the webpages. The web analytics data may be used in estimating the cost, value, or both, associated with various SEO opportunities. Examples of web analytics data that may be collected include number of visitors, page views, conversions (e.g., purchases), and the like or any combination thereof.

The search engine 110 can be an internal or private search engine that is used for the function of studying webpages of a website to determine relative rankings with respect to other webpages of the website as well to other webpages of other websites. The search engine 110 can be a public search engine or commercial search engine, such as those search engines of Bing, Google, Yahoo, or the like.

The SEO module 112 is configured for orchestrating and performing the webpage analysis of a website as described herein so that recommendations can be made to improve the website and improve the webpages that are provided by the search engine 110. The SEO module 112 is described in more detail herein.

Figure 1B:
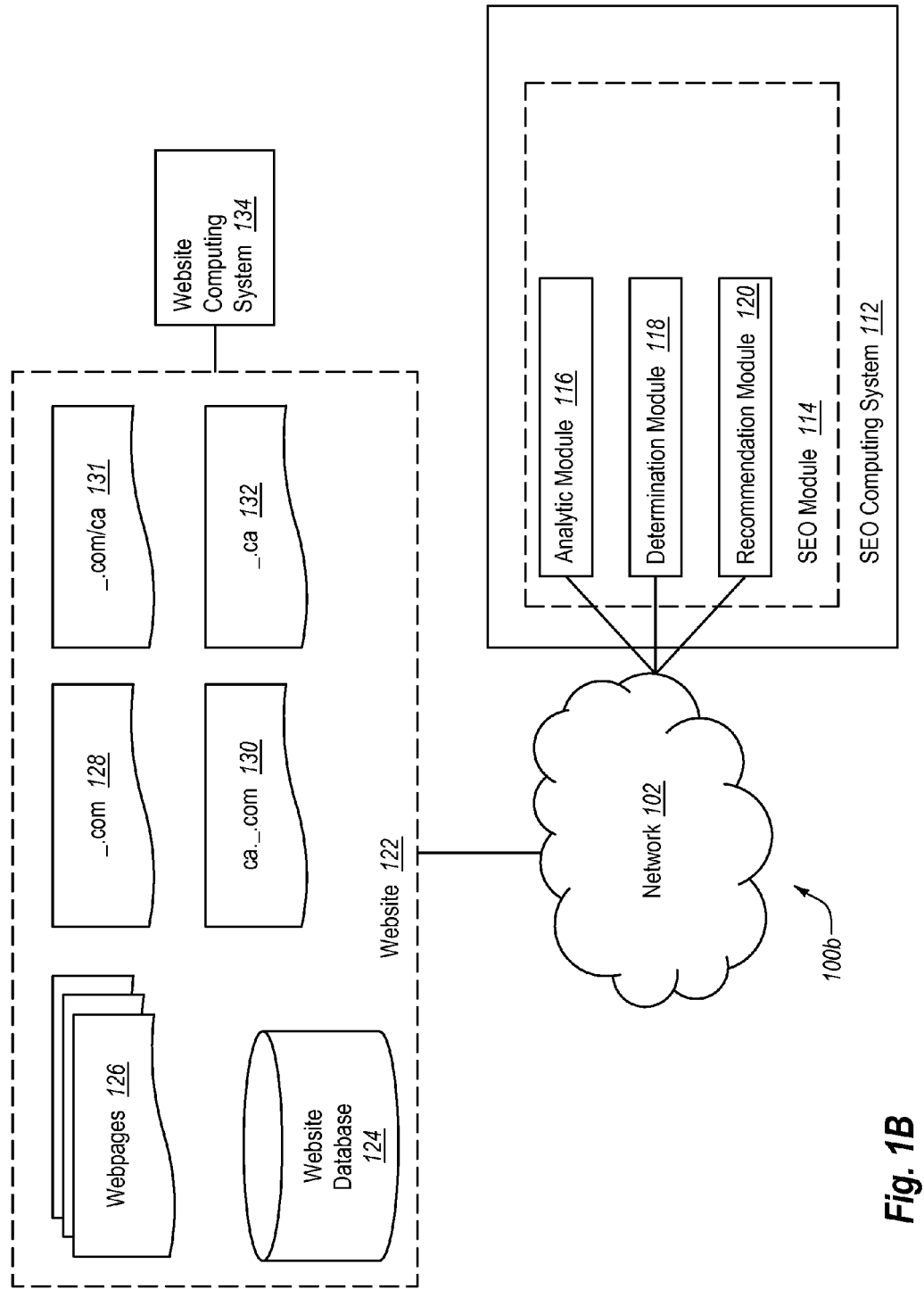
FIG. 1B illustrates another embodiment of a SEO system.

FIG. 1B shows another embodiment of a SEO system 100b. As shown, the network 102 operably couples a SEO computing system 112 with a website 122. The SEO computing system includes an SEO module 114 configured to perform SEO analysis and SEO recommendations as described herein. The SEO module 114 can include submodules for implementing particular functionalities. The SEO module 114 can be generic to and include an analytic module 116, determination module 118, and recommendation module 120. The website 122 is included on a website computing system 134, which can include a website database 124 that includes data relevant to webpage 126, such as webpages associated with generic domains "-.com" 128, country domains "_.ca" 132 (e.g., Canadian domain, others are known), subdomains "ca._.com" 130, or directories "_.com/ca" 131.

The analytic module 116 can be configured to analyze the webpages 126 of the website 126 to obtain data related to the ranking of the webpages 126 with respect to other webpages of the website 122 as well as other webpage of other websites. The analytic module 116 can perform any data analysis for improving SEO performance of the webpages 126 and the overall website 122. The analytic module 116 can include one or more algorithms for analyzing data relative to the webpages 126 of a website 122. The analytic module 116 can interface with the website database 124 to obtain data related to webpages 126 of the website 122.

The determination module 118 can obtain data from the analytic module 116, and can determine data relative to a webpage 126 ranking with respect to other webpages 126 of the website 122. The determination module 118 can include one or more algorithms for processing the data obtained from the analytic module 116. The determination module 118 can determine which webpage 126 can be grouped or bucketed together. The determination module 118 can determine what the search engine results indicate with respect to other webpages 126 of the website. The determination module 118 can determine what search engine parameters are associated with certain webpages 126, and may determine changes to search engine parameters to be associated with certain webpages 126. The determination module 118 may also be configured to determine a configuration of the website 122 for improved SEO performance.

The recommendation module 120 can compile information from the analytic module 116 and/or determination module 118 in order to make a recommendation for the website 122 in order to have improved SEO performance. The recommendation module 120 can include one or more algorithms that can provide one or more recommendations for improved SEO performance. The recommendation module 120 can configure information from the other modules and provide the information in a usable format so that the website 122 can have improved overall SEO performance and improved performance of select webpages 126 of the website 122. The recommendation module 120 can recommend keywords and keyword combinations to particular webpages 126 so that the particular webpages rank higher with respect to other pages of the website 122. This can include creating a plurality of landing pages for a plurality of different search keywords or keyword combinations.

Figure 2:
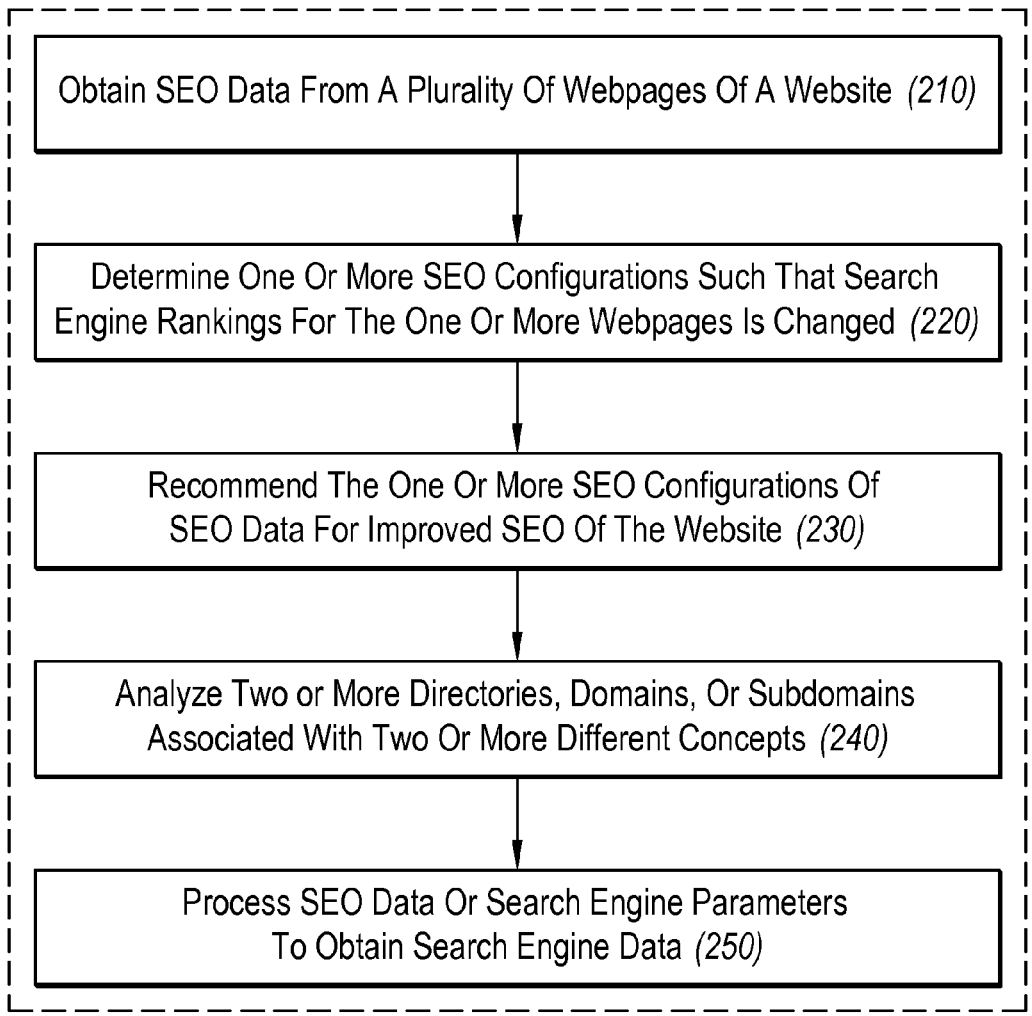
FIG. 2 illustrates a method of increasing SEO performance of webpages of a website.

FIG. 2 illustrates a general method 200 for increasing SEO performance of a website. The method 200 is shown to include obtaining SEO data from a plurality of webpages of a website (block 210); determining one or more SEO configurations of SEO data for the plurality of webpages of the website such that search engine rankings for the one or more webpages is changed with respect to other webpages of the website with regard to one or more search engines (block 220); and recommending the one or more SEO configurations of SEO data for improved SEO of the website (block 230). The website 122 can be analyzed for increasing SEO performance by analyzing, distinguishing two or more directories 131, domains 128, or subdomains 130 associated with two or more different concepts (block 240). The SEO data or search engine parameters include one or more keywords and geographical location data, which are processed by a search engine to obtain search engine data (block 250). In FIG. 2, the dashed box indicates that the method steps in blocks 240 and 250 are optional and may be performed at any interval. Other method steps described herein can be included in the method of FIG. 2.

Figure 3:
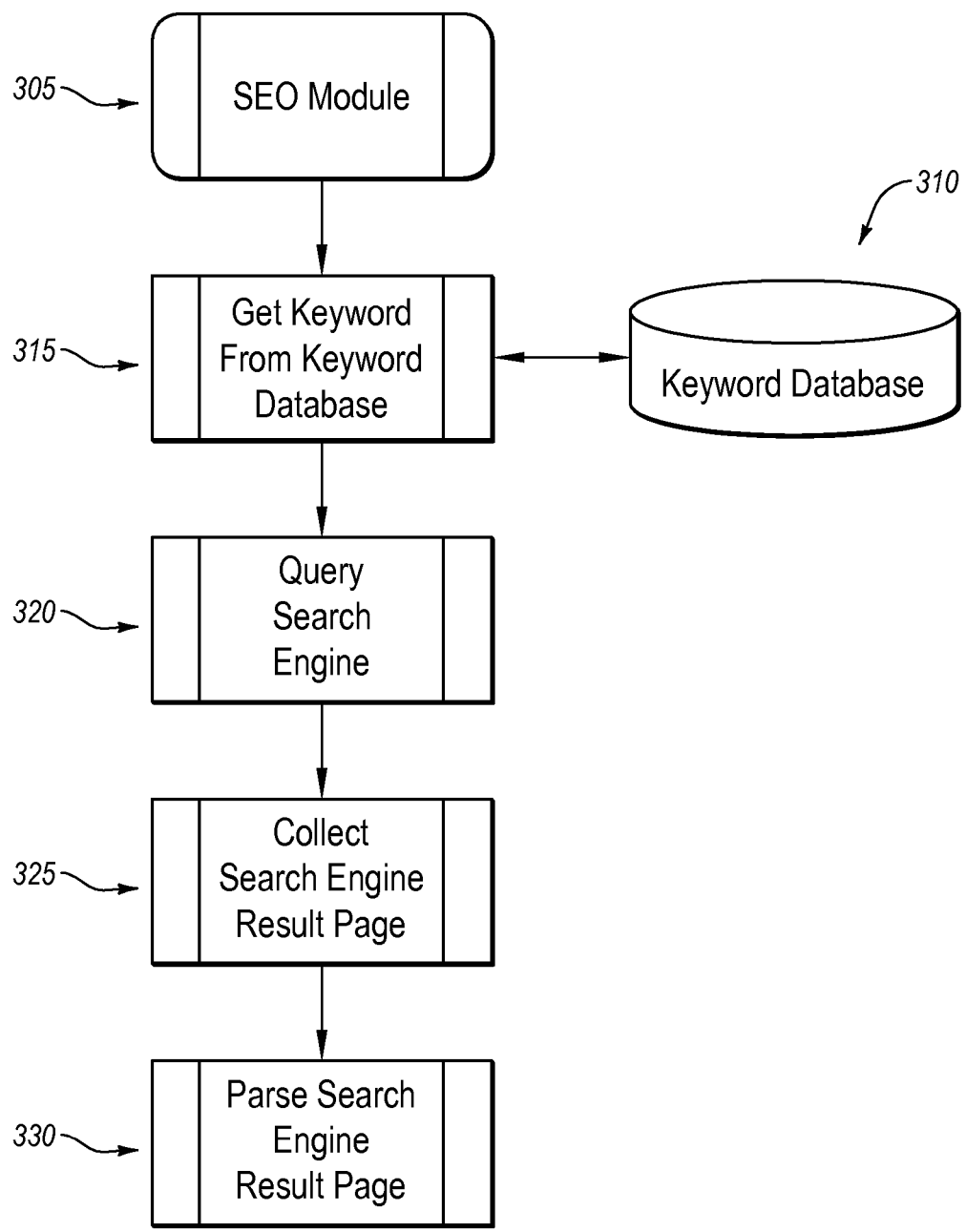
FIG. 3 illustrates a method of obtaining SEO data for webpages of a website.

FIG. 3 illustrates aspects of a method of obtaining SEO data for webpages 126 of a website 122. The method of FIG. 3 can be performed by a SEO module 305 in conjunction with a keyword database 310. The keyword database 310 contains one or more keywords associated with one or more webpages 126 of the website 122 to be used in an intra-website webpage ranking comparison search. In some embodiments, the deep index engine 108 of FIG. 1 can compile the keyword database 310. In other embodiments, the website database 124 of FIG. 1 can, prior to the page search, compile the keyword database 310.

Returning to FIG. 3, the SEO module 305 obtains 315 a keyword from the keyword database 310. The SEO module 305 then queries 320 a search engine for a webpage search. The search can include one or more searches per keyword or keyword combination associated with the webpages 126. The search engine can be any public or private search engine used to perform searches, whether now existing or created in the future. Multiple search engines can be used for each keyword or keyword combination to compile results or individual search engines can be used as preferred for each entity. The search can include just webpages of the website, or it can include other pages from the World Wide Web.

Once the search is performed, the SEO module 305 collects 325 the search engine results, which generally are referred to as search results pages. The search engine results page can include the search engine data that ranks webpages 126 of the website 122 against each other based on a keyword or keyword combinations. The result pages can be collected 325 as text to be processed by the SEO module 305 or saved in the keyword database 310, website database 124. The search engine result page can also be collected 325 in the original format or the data can be retrieved to find comparative webpage ranking for the different webpages on the website. This can also allow for the data to be analyzed so that the webpages can be ranked against each other for particular keywords or keyword combinations with respect to pages that have similar content or are related to directories, domains or subdomains of a topic. Nevertheless, any method that collects the search engine result pages, either now existing or created in the future, is contemplated for collecting the search engine result pages 325. After the search engine result pages are collected, the search engine result pages are parsed 330 for relevant information. The result page can be parsed 330 by SEO module 305 to obtain relative webpage rankings for specific keywords or keyword combinations. The information that is considered relevant can be determined by the parameters assembled processed through a determination module 118 of FIG. 1. For example, if so desired, only organic search results can be considered. Alternatively, only paid results may be considered if the online references are limited to paid advertisements within search engines.

Figure 4:
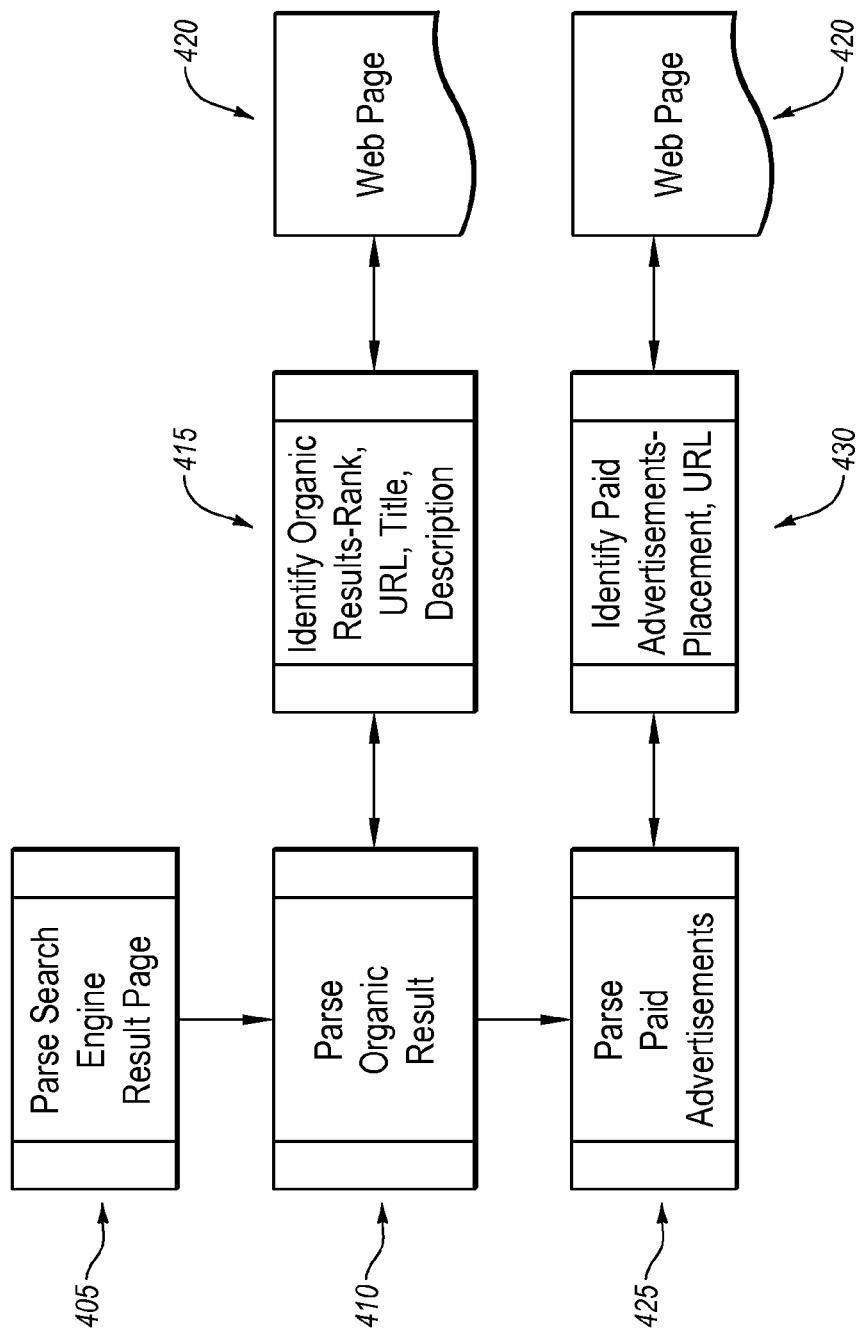
FIG. 4 illustrates a method of parsing a search engine result page for SEO data regarding a webpage (i.e., Web Page refers to specific webpage)

FIG. 4 illustrates aspects of a method of parsing a search engine result page for SEO data, such as a search engine result page obtained from a keyword search as illustrated in FIG. 3. In some embodiments, the method of FIG. 4 is performed by the SEO module 114 of FIG. 1.

The method of FIG. 4 begins by parsing 405 the search engine result page into one or more channel-related groupings, such as organic results and paid advertisements. For the purposes of this example, organic results and paid advertisements are treated differently, although in other embodiments they may be treated the same or differently. The SEO module parses 410 the organic results to identify 415 one or more signals in the organic results of the search engine result page based on the keyword or keywords. These signals can help identify the relevance of a webpage for a keyword or keyword combination of a search engine result as well as help identify one or more webpages to be associated with particular keywords and keyword combination as well as the strength of the keyword or keywords associated with particular webpages.

The SEO module can also parse 425 the paid advertisement results to identify 430 one or more signals in the paid advertisement results of the search engine result page based on the keyword or keyword data. Prominent placement is often considered more effective and, therefore, will normally cost more, than less prominent placement of a paid advertisement. This is similar for strength of keywords. Therefore, placement of the paid advertisement within a search engine result page gives an indication of how much was paid for an advertisement and the relevance that is placed on the correlation between the keyword or keyword combination searched and the marketer placing the advertisement. As with the organic search results, a preferred webpage pointed to by a paid advertisement can be identified and itself parsed for additional data for the website.

With combined reference to FIGS. 3 and 4, it is noted that, in this example, the same SEO module 114 that performs the search need not visit the webpage that is ultimately searched. For example, one module can obtain 315 a keyword from the keyword database 310, query 320 the search engine and collect 325 the results. A second module can parse 330, 405 the result page, identifying 410, 425 which results are organic and which results are paid. A third module can identify 415 the appropriate signals of the organic results while a forth module can identify 430 the appropriate signals of the paid results.

In other embodiments, the results can be presented as raw data. For example, the results could be presented as the number of hits on a particular Web Page, i.e., the traffic history of the Web Page, or as the organic search result rank for a particular keyword or set of keywords. In further embodiments, the results can be presented as mentions in a particular media. For example, the results can be presented as the number of mentions within blogs. Alternately or additionally, the results can be further broken down. For example, blog mentions can be broken down into positive mentions and negative mentions.

Figure 5:
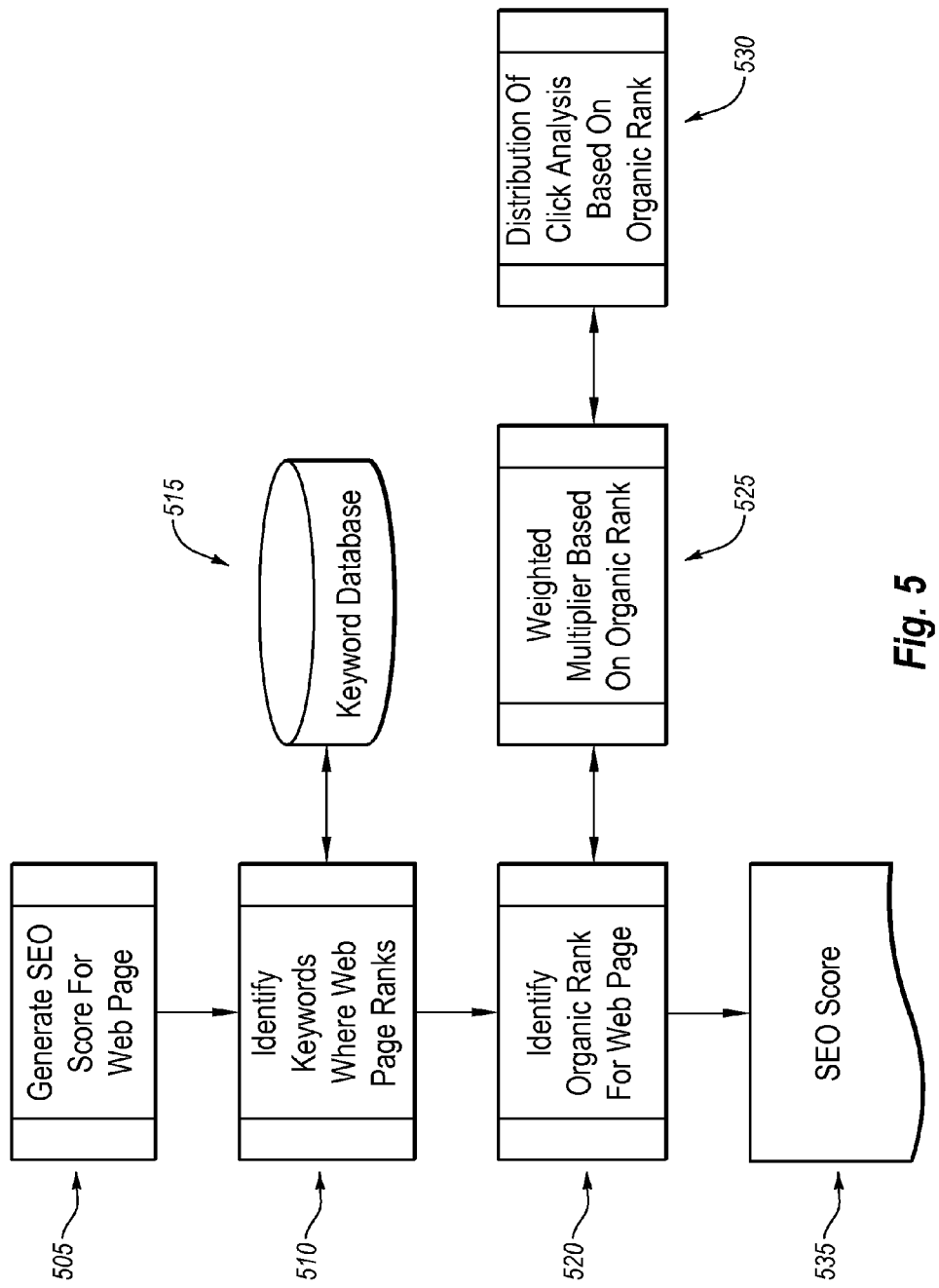
FIG. 5 illustrates a method for obtaining an SEO score for a webpage of a website.

FIG. 5 illustrates one example of a method for obtaining an SEO score of the webpages of the website with respect to each other. In this example, the results have a search engine optimization (SEO) score generated 505 for a webpage of the website. In other words, the results are presented based on some predefined criteria, such as placement within search engine results with respect to each other for a given keyword or keyword combination. The search engine results can include organic searches, paid searches or both. Additionally, the SEO score can be factored to weigh more heavily search results from a particular search engine. For example, high placement in the results of a more popular search engine can influence the SEO score more than the results of a less popular search engine. The SEO score for a webpage can then be analyzed against related webpages of the website. The SEO score can be modulated by altering SEO parameters associated with the webpages.

Alternatively or additionally, a SEO score generated according to the method of FIG. 5 can include an advertisement score. In some embodiments, the advertisement score can be used to indicate the cost-effectiveness of an advertisement. For example, if a first advertisement generates 50% of the traffic of a second advertisement, but the first advertisement costs only 10% to run compared to the second advertisement, it may be given a higher advertisement score to indicate that it is more cost-effective in generating traffic.

The method of FIG. 5 further includes identifying 510 keywords and relative webpage rank. In some embodiments, identifying 510 keywords and relative webpage rank can be done by obtaining possible keywords from a keyword database 515 of the website and performing a search on the keywords. The results for different webpage and keywords can then be compared. In other embodiments, the keywords can be keywords of interest for a particular webpage of the website, and the results of the keyword search can have SEO scores generated. In further embodiments, the keyword database can be compiled in any other way that is desired for SEO optimization.

Once the keyword(s) has been searched, the organic rank for each webpage is identified 520. A weighted multiplier is then applied 525 to the organic rank, where the weighted multiplier can be based on the organic rank. That is, the weighted multiplier is different for each ranking (i.e., not a constant). In some embodiments, the weighted multiplier considers 530 the distribution of click analysis of the organic rank. That is, the multiplier takes into account the number of users that follow the link to the URL. For example, a search may turn up a result that is irrelevant to the majority of users for whatever reason. Even if the ranking of the result is high, the multiplier can be adjusted to reflect the low number of users who follow the link. From the weighted multiplier and the organic rank, an SEO score can be generated 535. The SEO score allows an analysis of the relevance of the references based on the predefined criteria.

In some embodiment, a method for increasing SEO performance of a website can include the following: obtaining SEO data from a plurality of webpages of a website; determining one or more SEO configurations of SEO data for the plurality of webpages of the website such that search engine rankings for the one or more webpages is changed with respect to other webpages of the website with regard to one or more search engines; and recommending the one or more SEO configurations of SEO data for improved SEO of the website. The website for increasing SEO performance can includes two or more directories, domains, or subdomains associated with two or more different concepts. The SEO data or search engine parameters include one or more keywords and geographical location data. The increased SEO performance described herein can be useful for a multinational website having a plurality of webpages for a plurality of countries or languages. Also, a website that can undergo the method of increasing SEO performance can include two or more webpages associated with two or more different countries or languages.

In some embodiments, the method can include obtaining SEO data from a plurality of webpages of a website with regard to search engine parameters, and determining SEO performance of the website in terms of relative webpage rakings by one or more search engines using the search engine parameters. The method can also, in one aspect, include identifying search engine parameters to be associated with one or more of the webpages in order to change the relative webpage rankings by the one or more search engines. The method can also, in another aspect, include providing the one or more SEO configurations of SEO data to a controller of the website.

In some embodiments, the method can include synthesizing SEO data for one or more directories, domains, and subdomains of the website, and grouping different webpages having related SEO data into one or more buckets for SEO optimization.

The method can be implemented such that SEO performance of the website is optimized with respect to different webpages and/or webpage hierarchy within the website such that specific search engine parameters direct users to specific webpages instead of a generic landing webpage. Also, the SEO performance of the website can be improved such that a particular keyword or keyword combination results in a particular landing webpage for the particular keyword or keyword combination as a search engine result.

In some embodiment, the method can include determining a search engine ranking status of one or more particular webpages within the website, and recommending a change to one or more search engine parameters of the one or more particular webpages to change the search engine ranking status of at least one webpage so that a user can land on the at least one webpage within the website related to the search engine parameters.

Initially, it may be helpful to crawl the website in order to identify initial SEO data. The initial SEO data can then be used in the method to improve SEO performance so that the resultant SEO data provides an improvement over the initial SEO data.

In some embodiments, the method can include identifying a first rank of two or more different webpages of a website with respect to each other for one or more search engine parameters for each webpage. The method can then include recommending a change to the one or more search engine parameters for the different webpages so as to achieve a second rank so that a particular search engine parameter or combination of parameters yields a particular webpage associated with the particular search engine parameter or combination of parameters.

In some embodiments, the method can include crawling the website to identify webpages that have overlapping keywords or SEO data, and grouping related webpages for SEO processing. The grouping can be used to rank the webpages in a group so that a preferred webpage is provided by a search engine for one or more of the overlapping keywords.

In some embodiments, the method can include analyzing directories, domains, and/or subdomains of a website so that particular webpages for different countries or languages can be optimized and directed for particular search engine parameters. However, instead of just different countries or languages, the directories, domains, and/or subdomains can be optimized for certain topics or subject matter.

In some embodiments, the method can include analyzing one or more keywords or keyword combinations for two or more different webpages. The data obtained in the analysis can then be used for determining an overlap of the one or more keywords or keyword combinations for two or more different webpages. This can allow for the SEO data to be better understood with respect to webpage rankings. Once the SEO data is understood with respect to search engine results and rankings, recommendations can be make for allocating one or more unique keywords or keyword combinations for a group of primary webpages within the website.

The methods described herein can be used for optimizing the webpages of the website for a specific search engine. Also, it can be used for optimizing webpages on two or more different search engines. Moreover, the website can be optimized in view of higher used search engines, such as Bing, Google, and Yahoo search engines.

Some embodiments disclosed herein include computing methods for entity websites that include international domains. It can be advantageous to determine how to present a website for SEO when the website has generic a generic "-.com" and an international page such as a "-.ca." It can be beneficial to have the ability to report on multiple domains together instead of just reporting on one domain, such as the "-.com" domain. For example, it would be beneficial to report on multiple domains together, such as "-.com" and "-.ca." These domains could be subdomains or subdirectories, which can include "-.-.com" and "store.-.com/uk." As used herein, "domain" can refer to a top level domain, a subdomain, or a sub-directory. On the other hand, a "site" can refer to one domain or rolled-up domains.

It has been found in SEO that simply reporting on the top keyword page may not be sufficient. It can now be important to see where all listings of webpages of the website rank. For example, it may be helpful to compare the "-.com" and "-.ca" rankings for SEO.

The webpages of a website, including the general and international domains, can be rolled-up and associated for improved SEO. The rolled-up domains of a website can be beneficial for SEO techniques described herein. The rolled-up domains can be attached to an account, which can be defined by a list of top level domains, subdomains, or sub-directories.

A keyword portfolio can be unique for a website or an account. For example, the keyword portfolio for a website or account can diverge over time so that different keywords for different webpages diverge. Before SEO as described herein, all the webpages may have the same keywords. Additionally, an account can include keyword data about competitors so that the competitor data can be used for SEO optimization of the webpages of an account. A list of search engines and rankings for the keywords can also be associated with the account.

An example of SEO optimization for a website or account can be provided as follows. A keyword report for SEO can be performed for a company for an SEO Manager for a particular country. The United Kingdom (UK) site for the company can be "uk.-.com" and "store.-.com/uk." The competition can be "uk . - - - . com" and "store . - - - . com/uk." The keyword portfolio for the UK can be different from the US keyword portfolio. A search engine when searched with keywords of the keyword portfolio of the UK site can results in rolled-up keyword reports for their own domains as well as the competition domains. It would be helpful if the SEO Manager could have the keyword information and search engine reports on their dashboard with regard to the keyword reports for their own website as well as that of the competitor. Also, the global SEO Manager for the company may want some charts related to UK keyword and website performance on a global dashboard. For example, a representative dashboard is depicted in FIG. 7.

Figure 7:
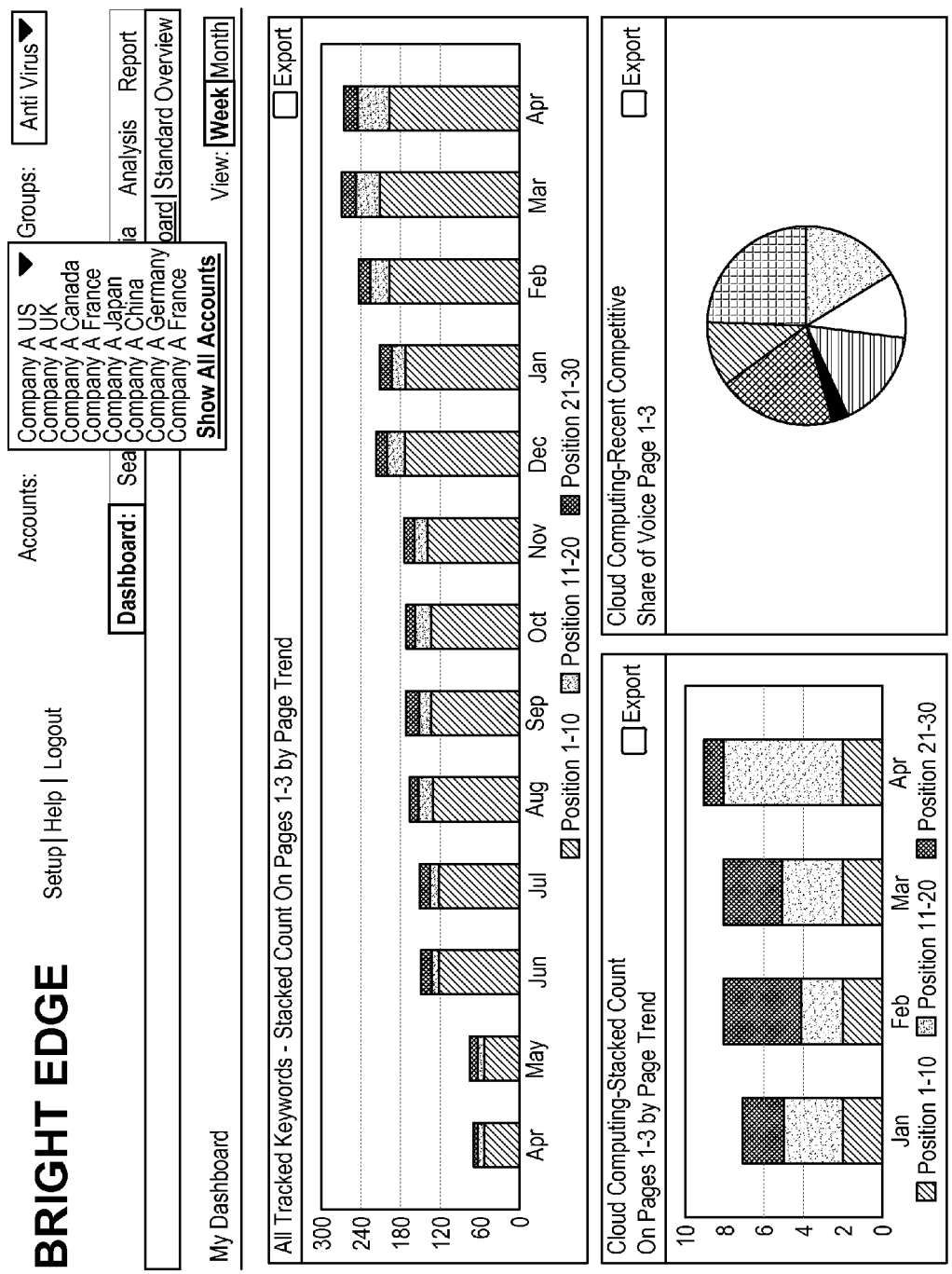
FIG. 7 includes a representation of a screenshot of a graphical interface, referred to as "Dashboard" for SEO.

FIG. 7 shows an example of a screen shot of a dashboard for an account with multiple domains, such as international domains. This shows a dashboard with multiple countries, such as U.S., U.K., Canada, France, Japan, China, and Germany.

Figure 8:
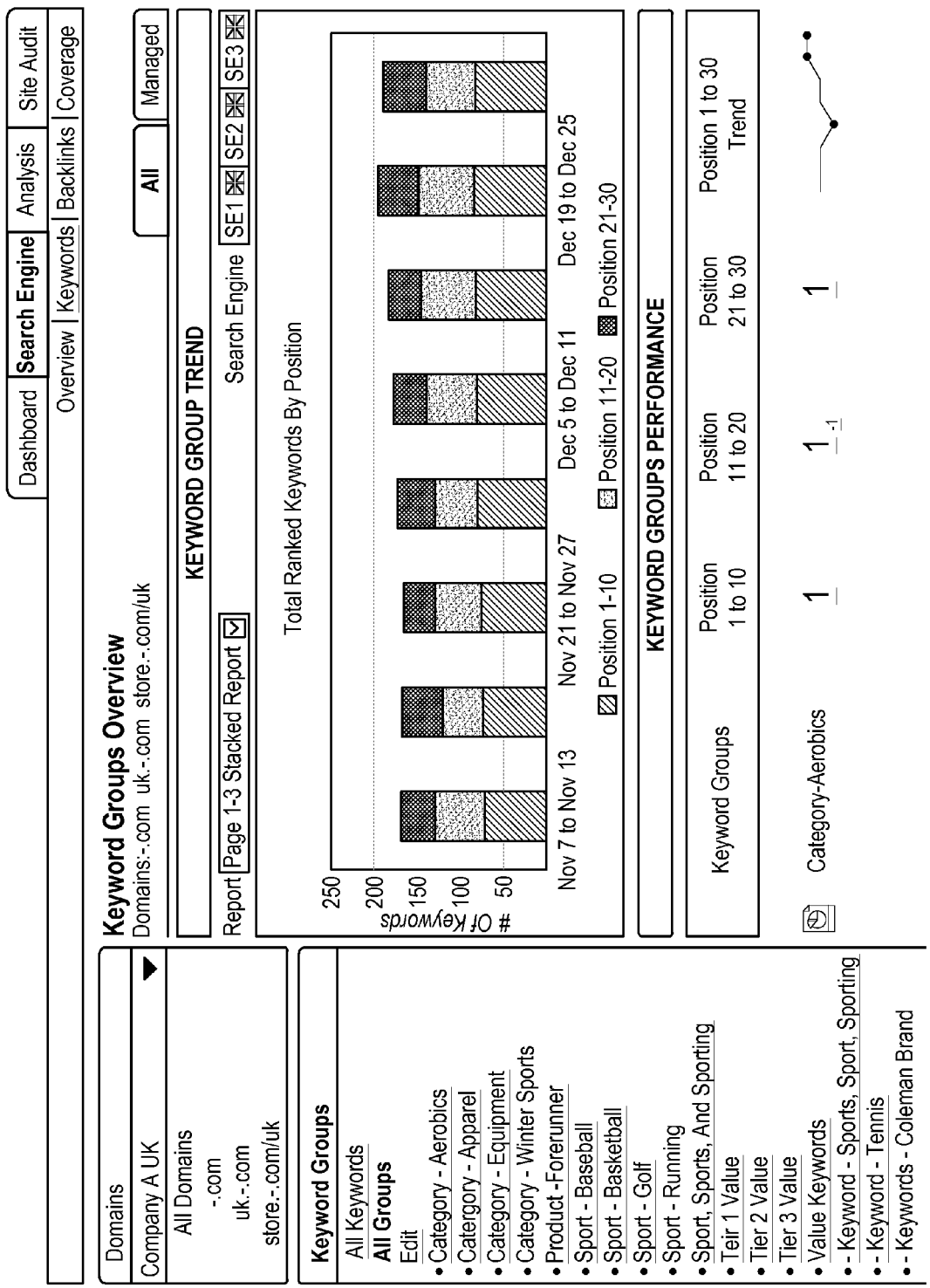
FIG. 8 illustrates a representation of a screenshot of a graphical interface, referred to as "Search Engine" for SEO.

FIG. 8 shows an example of a screen shot of information under a Search Engine tab. The information can include a keyword group overview for the domains "-.com," "uk.-.com," and "store.-.com/uk," which can be selected from a dropdown menu on the left side. The keyword groups are shown on the left bar. The right side includes three different search engines (e.g., SE1, SE2, and SE3) that can be used for the SEO. The graph shows total ranked keywords by position which can include the percentage of keywords with respect to time intervals.

Figure 9:
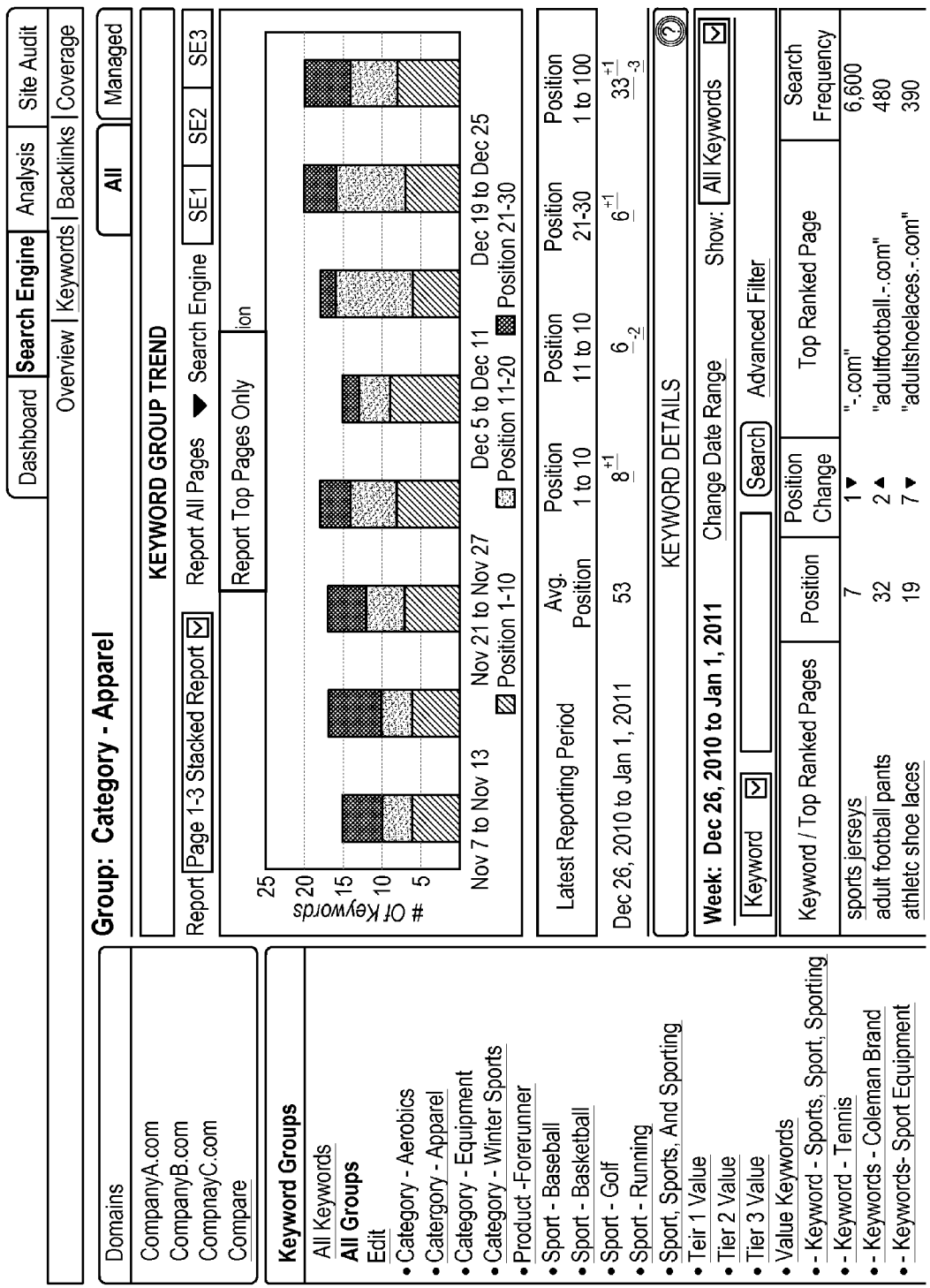
FIG. 9 illustrates another representation of a screenshot of a graphical interface, referred to as "Search Engine" for SEO.

As shown in the example of the screen shot of FIG. 9, keyword data can be graphed for particular keyword groups for categories, such as apparel. The report can be changed from a report on all pages or a report on the top page. SEO data can be analyzed, and various types of SEO data reports can be provided as illustrated.

FIG. 10 shows an example of a ranking page for multiple pages on a website. The ranking page can provide information about positions of webpages of a website. Under "Ranked Page," the webpages can be sorted and ranked and grouped by main domains defined for a website. Also, there can be an option for showing keywords for which one domain is first. This can determine if "-.com" is ranked higher than "-.ca". Also, the average position may be useful for a single webpage, but maybe no when count is for all webpages of the website. The change in position can be defined for a keyword-page pair.

Figure 11:
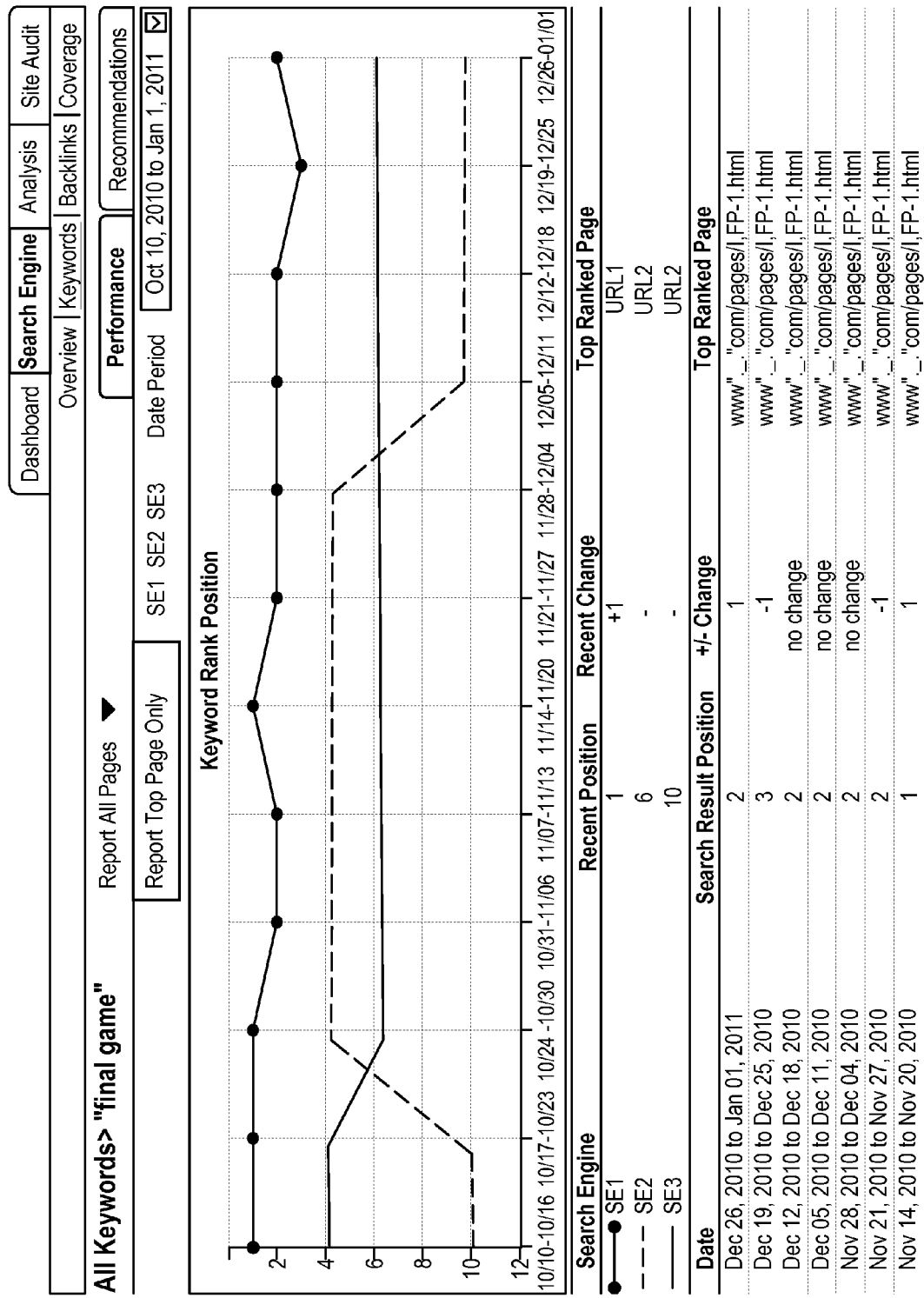
FIG. 11 illustrates a representation of a screenshot of a graphical interface showing keyword performance over time.

FIG. 11 shows an example of a SEO report, which provides SEO data for keyword rank position over time, SEO information from three different search engines, and search results positions and changes over time.

FIG. 12 shows an example of an interface that allows for various settings to be selected in order to configure an SEO report as described herein.

In another example, a search engine can provide results that show the website footprint (e.g., "-.com" and "-.ca"). It can be helpful to identify which keywords that show up on a "-.com" before a "-.ca."

In another example, it can be beneficial for a keyword rank report to report on all webpage of a website and not just the first one that is found by the search engine.

Now, the present invention provides the ability to get rolled-up reporting on multiple domains. This can include rolled-up reporting for certain keywords, keyword groups, individual keywords, and dashboard charts for keywords. A keyword portfolio can be the same across all domains in a roll-up. New domains can be added at any time. However, the rolled-up reporting is not retroactive. The new domain can take effect in the system after it is added by SEO. Also, the rolled-up reporting can provide for the ability to define search engines for a given account. For example, three search engines can be used for the reports, however, more or less could be used. It can be beneficial to have the ability to report on all listings for all the domains in the account. This can show the top listings for the website. It can also show all listings for a site. The rolled-up reporting can provide supporting data for individual keywords and groups of keywords. The rolled-up report information can also be used in dashboards.

In some embodiments, it can be beneficial for the SEO described herein to define a website as having multiple domains. This can include the ability to define a website as one or more domains, where a domain can be considered as a top level domain, a subdomain, or a URL. The website can be attached to a certain account for SEO. The different webpages that are related, such as "uk.-.com" and "store.-.com/uk," may be given a single identifier, which can be a readable name or label. This readable name or label can be available for the main website as well as for a competitor's website.

It can be possible to select any one of the domains of a website, and get reporting on that single domain. However, rolled-up reporting can be available for all domains of a website, such that all of the results are rolled-up together for a whole website.

It may also be beneficial to be capable of selecting a website for SEO similarly to how individual domains have been selected for SEO. There may be the ability to select an individual domain that is part of a multi-domain website. This can be done for a particular SEO manager for their site or for a competitor site. Multiple domains for a single competitor site can also be selected.

It may also be beneficial to assign certain search engines to a whole website or an account. The one or more search engines can be defined for each website or account. Also, the order of search engines displayed can be defined, or the first listed can be a default. The search engines can be displayed with unique icons that depict the engine and country. There can also be support for multiple languages in the search engines when available. For example, in Canada both English and French may be useful.

It can also be beneficial be able to obtain a SEO report and ranking for a top ranked pages as well as all ranked pages for multiple listings. This can be for one or more search engine rankings. Instead of just reporting on the top page of a website, now all of the pages can get a rank for a website. Also, the number of webpages in a site that get ranked can be identified, such as the top 10, 25, 50, or 100 pages. Also, the all of the pages that rank in some top position, such as top 10, 25, 50, or 100, can be obtained for a keyword or keyword combination. The reports for a website can be obtained periodically and the periodic reports can be compared and contrasted for keywords and rankings. This can be day to day, week to week, or month to month. It may also be desirable to get stacked reports that count multiple listings.

A default setting can be defined at an account level in order to describe whether reporting is for the top listings or for all listings. Any number or level of webpage listings can be chosen. The default setting can be changed for a domain or for an entire website or account. The dashboard for keywords, there can be a selection for top rankings or all ranked pages for a keyword or keyword combination.

It can be advantageous if SEO supports selection for more than one search engine. Preferably, the SEO supports multiple search engines. The scheme for recommendations for SEO can consider a website as whole so that different pages can be ranked differently. This can include SEO for the webpages of the website with regard to keywords. It can be beneficial for SEO to consider multiple domains of a website, and then to provide a recommendation for each individual domain. The separate recommendations can be based on the type of domain, or content of domain. It can be beneficial to group domains together that are controlled or influenced as well as those that are not controlled.

Some embodiments disclosed herein include a computer program product having computer-executable instructions for causing a computing system having the computer program product to perform a computing method of the computer-executable instructions for improving SEO of webpages within a website. The computing method can be any method described herein as performed by a computing system. The computer program product can be located on a computer memory device, which may be removable or integrated with the computing system.

Some embodiments include a computing system capable of performing the methods described herein. As such, the computing system can include a memory device that has the computer-executable instructions for performing the method.

In some embodiments, a computing device, such as a computer or memory device of a computer, can include a determination module and a recommendation module. The determination module and recommendation module can be configured to perform any of the methods described herein. Also, the determination module and recommendation module can be combined into a single module or on a single platform.

In some embodiments, the determination and recommendation platform can provide a particular landing webpage within a website depending on the particular search parameters used. As such, instead of being directed to a generic landing page that all users land on, the user is directed to a particular page within the website based on the search parameters. For example, a company with a large internet footprint can include a main US webpage and a main Canadian webpage. Usually a search engine will direct a user to the main US webpage no matter what the user is searching for or their user-specific search parameters. The present invention can provide SEO data to the company so that they can configure their SEO data to provide more directed landing webpages instead of a generic landing webpage.

Some embodiments described herein are capable of characterization of webpages of a website and grouping like webpages together, such as in data "buckets." The bucketing can be used in SEO processing.

In some embodiment, the determination and recommendation platform can be configured to provide suitable information to a website so that on-peak and off-peak search recommendations can be accounted for. Alternately, website structure recommendations can be made, such as changing the hierarchy or arrangement of a website. Some of the recommendations that can be made include recommendations for a particular hierarchy, site structure, a way to refocus site structure, a way to make website crawlable or more crawlable by different search engines, or generally making particular webpages available as landing webpages for particular search parameters. If a website does not have SEO optimized webpages, a search engine may not return the right webpage or the right webpage for a particular user or audience. The present invention overcomes this problem and provides for an analysis and recommendation that results in more directed and pointed webpage results with regard to particular search parameters.

The methods described herein can be used for optimizing the webpages of the website for a specific search engine. Also, it can be used for optimizing webpages on two or more different search engines. Moreover, the website can be optimized in view of higher used search engines, such as Bing, Google, and Yahoo search engines.

Some embodiments described herein include a computer program product having computer-executable instructions for causing a computing system having the computer program product to perform a computing method of the computer-executable instructions for improving SEO of webpages within a website. The computing method can be any method described herein as performed by a computing system. The computer program product can be located on a computer memory device, which may be removable or integrated with the computing system.

Some embodiments described herein include a computing system capable of performing the methods described herein. As such, the computing system can include a memory device that has the computer-executable instructions for performing the method.

In some embodiments, a computing device, such as a computer or memory device of a computer, can include a determination module and a recommendation module. The determination module and recommendation module can be configured to perform any of the methods described herein. Also, the determination module and recommendation module can be combined into a single module or on a single platform.

The computer program product can include one or more algorithms for performing any of the methods of any of the claims. The computer program product can include one or more algorithms for performing any of the methods of any of the claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein can implement the functionalities associated with the name of the module or component.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs.

efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
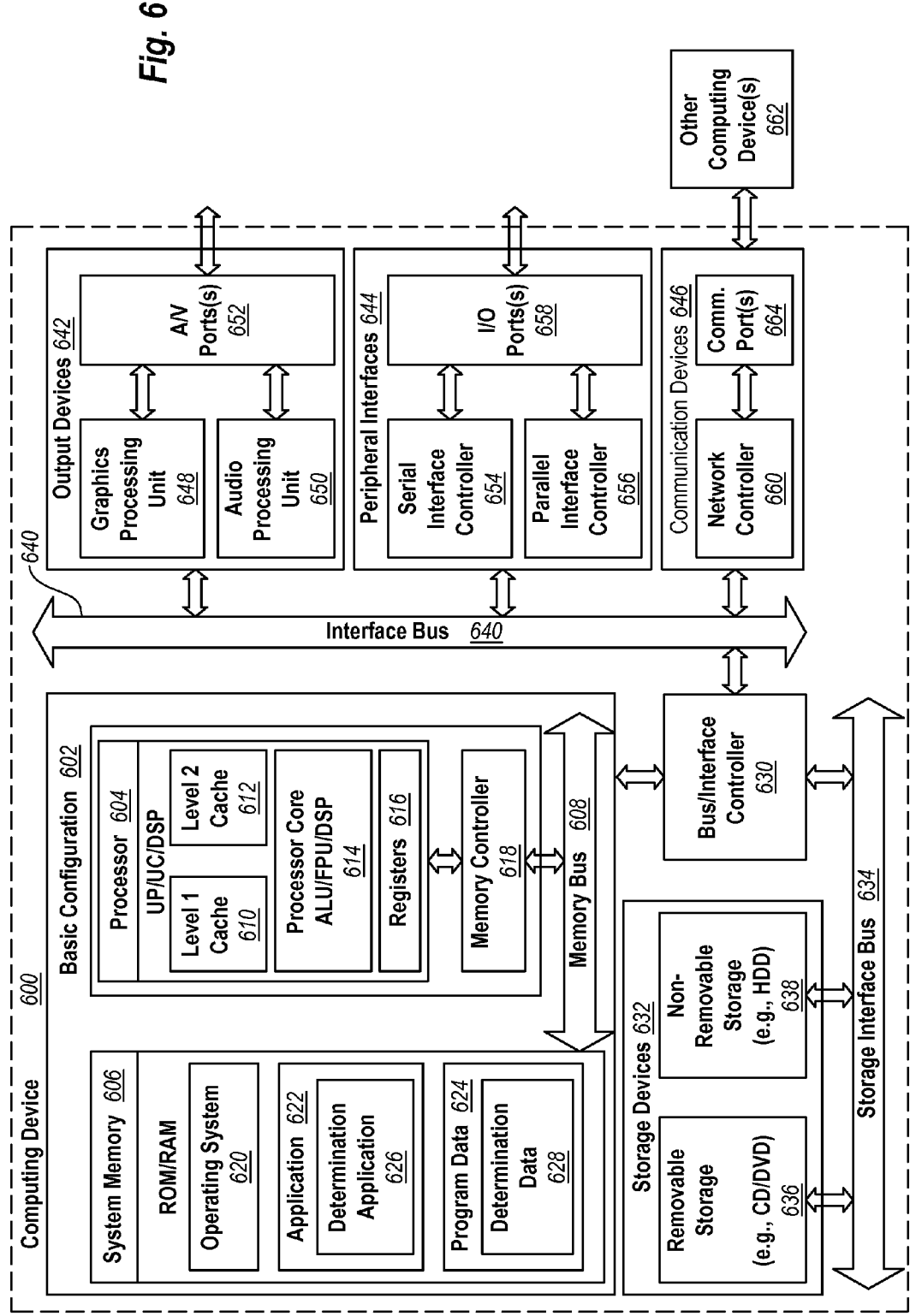
FIG. 6 illustrates an embodiment of a computing system that can implement the invention described herein.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method for increasing search engine optimization (SEO) performance of a first website, the method comprising:
    obtaining SEO data from a plurality of webpages of the first website, the SEO data including data describing a geographic location;
    determining, based on the geographic location and a common topic, a webpage ranking status describing relative rankings of webpages that include webpage content related to the common topic, the relative rankings of the webpages including first search engine rankings of one or more first webpages within the first website relative to a combination of second search engine rankings of one or more second webpages within the first website and third search engine rankings of one or more third webpages within a second website in one or more search result pages generated by one or more search engines based on the geographic location and the common topic;
    generating one or more SEO scores for the one or more first webpages at least by weighting the first search engine rankings of the one or more first webpages with multipliers related to one or more click analysis results of the one or more first webpages, wherein a click analysis result for a corresponding webpage from the one or more click analysis results describes an estimated or actual number of clicks on one or more links to the corresponding webpage from the one or more search result pages;
    determining, by one or more processors, one or more SEO configurations from the SEO data for the plurality of webpages of the first website, the one or more SEO configurations configured to change, based on the geographical location and the one or more SEO scores, the first search engine rankings of the one or more first webpages within the first website relative to the combination of the second search engine rankings of the one or more second webpages within the first website and the third search engine rankings of the one or more third webpages within the second website with regard to the one or more search engines; and
    recommending the one or more SEO configurations for the first website.

2. The method of claim 1, comprising:
    obtaining the SEO data from the plurality of webpages of the first website with regard to one or more first search engine parameters; and
    determining an SEO performance of the first website in terms of relative webpage rankings by the one or more search engines using the one or more first search engine parameters.

3. The method of claim 2, comprising
    identifying one or more second search engine parameters associated with the one or more first webpages from the one or more first search engine parameters, the one or more second search engine parameters configured to change the relative webpage rankings by the one or more search engines.

4. The method of claim 1, comprising:
providing the one or more SEO configurations to a controller of the first website.

5. The method of claim 1, comprising:
synthesizing the SEO data for one or more directories, domains, and subdomains of the first website; and
grouping different webpages having related SEO data into one or more buckets used in SEO optimization.

6. The method of claim 1, wherein an SEO performance of the first website is increased with respect to different webpages within the first website, wherein the one or more SEO configurations include specific search engine parameters that direct users to specific webpages instead of a generic landing webpage.

7. The method of claim 1, wherein an SEO performance of the first website is improved by providing a particular landing webpage as a search engine result for one of a particular keyword and a keyword combination.

8. The method of claim 1, wherein the SEO data includes one or more keywords.

9. The method of claim 1, wherein the first website is a multinational website having the plurality of webpages for a plurality of nations or languages.

10. The method of claim 1, wherein the first website includes two or more webpages associated with two or more different countries.

11. The method of claim 1, wherein the first website includes two or more directories, domains, or subdomains associated with two or more different countries.

12. The method of claim 1, comprising:
recommending a change to one or more search engine parameters of the one or more first webpages, the change to the one or more search engine parameters configured to change the first search engine rankings of the one or more first webpages, the change to the one or more search engine parameters configured to direct a user to land on at least one webpage from the one or more first webpages within the first website related to the one or more search engine parameters.

13. The method of claim 1, wherein the one or more SEO scores include one or more advertisement scores that indicate cost-effectiveness of one or more advertisements.

14. The method of claim 1, comprising
identifying a first rank of two or more different webpages of the first website with respect to each other for one or more search engine parameters for each webpage; and
recommending a change to the one or more search engine parameters for the two or more different webpages, the change to the one or more search engine parameters configured to achieve a second rank of the two or more different webpages, wherein a particular search engine parameter from the one or more search engine parameters yields a first particular webpage associated with the particular search engine parameter, and wherein a combination of the one or more search engine parameters yields a second particular webpage associated with the combination of the one or more search engine parameters.

15. The method of claim 1, comprising:
crawling the first website to identify webpages that have overlapping keywords or SEO data; and
grouping the webpages for SEO processing.

16. The method of claim 1, comprising:
determining a unified website configuration having individual webpages with higher search engine rankings for specific search engine parameters.

17. The method of claim 1, comprising:
analyzing directories, domains, and subdomains of the first website, wherein particular webpages of the first website for different countries or languages is optimized and directed for particular search engine parameters.

18. The method of claim 1, comprising:
analyzing one or more keywords or keyword combinations for two or more different webpages; and
determining an overlap of the one or more keywords or keyword combinations for the two or more different webpages.

19. The method of claim 1, comprising recommending allocating one or more unique keywords or keyword combinations for a group of primary webpages within the first website.

20. The method of claim 1, comprising optimizing the plurality of webpages of the first website for a specific search engine.

21. A computing system for improving search engine optimization (SEO) of webpages within a first website, the computing system comprising:
a processor; and
a memory storing instructions that, when executed, cause the computing system to:
obtain SEO data from a plurality of webpages of the first website, the SEO data including data describing a geographic location;
determine, based on the geographic location and a common topic, a webpage ranking status describing relative rankings of webpages that include webpage content related to the common topic, the relative rankings of the webpages include first search engine rankings of one or more first webpages within the first website relative to a combination of second search engine rankings of one or more second webpages within the first website and third search engine rankings of one or more third webpages within a second website in one or more search result pages generated by one or more search engines based on the geographic location and the common topic;
generate one or more SEO scores for the one or more first webpages at least by weighting the first search engine rankings of the one or more first webpages with multipliers related to one or more click analysis results of the one or more first webpages, wherein a click analysis result for a corresponding webpage from the one or more click analysis results describes an estimated or actual number of clicks on one or more links to the corresponding webpage from the one or more search result pages;
determine one or more SEO configurations from the SEO data for the plurality of webpages of the first website, the one or more SEO configurations configured to change, based on the geographical location and the one or more SEO scores, the first search engine rankings of the one or more first webpages within the first website relative to the combination of the second search engine rankings of the one or more second webpages within the first website and the third search engine rankings of the one or more third webpages within the second website with regard to the one or more search engines; and
recommend the one or more SEO configurations for the first website.

22. A computer-implemented method for increasing search engine optimization (SEO) performance of a website, the method comprising:

analyzing, by one or more processors, a plurality of webpages to identify a group of webpages with an overlapping keyword from the website, the group of webpages including one or more first webpages and one or more second webpages;

obtaining SEO data from the plurality of webpages of the website, the SEO data including the overlapping keyword and data describing a geographic location;

determining, based on the geographic location and a topic, an intra-website webpage ranking status describing internal relative rankings of the group of webpages that are associated with the overlapping keyword, the group of webpages being hosted by the same website and related to at least one of a directory, a domain, and a subdomain of the topic, wherein the internal relative rankings of the webpages include first search engine rankings of the one or more first webpages relative to second search engine rankings of the one or more second webpages in one or more search result pages generated by one or more search engines based on the geographic location and the topic;

generating one or more SEO scores for the one or more first webpages at least by weighting the first search engine rankings of the one or more first webpages with multipliers related to one or more click analysis results of the one or more first webpages, wherein a click analysis result for a corresponding webpage from the one or more click analysis results describes an estimated or actual number of clicks on one or more links to the corresponding webpage from the one or more search result pages, and the one or more SEO scores include one or more advertisement scores describing cost-effectiveness of one or more advertisements;

determining one or more SEO configurations from the SEO data for the plurality of webpages of the website, the one or more SEO configurations configured to change, based on the SEO data including the overlapping keyword, the one or more SEO scores and the geographical location, the first search engine rankings of the one or more first webpages relative to the second search engine rankings of the one or more second webpages within the website with regard to the one or more search engines; and recommending the one or more SEO configurations for the website.

* * * * *